United States Patent
Cynn

(10) Patent No.: US 11,679,351 B2
(45) Date of Patent: Jun. 20, 2023

(54) AIR PURIFIER WHOSE AIR INLET DIRECTION IS ADJUSTED ACCORDING TO DIRECTION OF WIND

(71) Applicant: Kie-Ho Cynn, Kapolei, HI (US)

(72) Inventor: Kie-Ho Cynn, Kapolei, HI (US)

( * ) Notice: Subject to any disclaimer, the term of this patent is extended or adjusted under 35 U.S.C. 154(b) by 750 days.

(21) Appl. No.: 16/267,283

(22) Filed: Feb. 4, 2019

(65) Prior Publication Data

US 2019/0351358 A1  Nov. 21, 2019

(30) Foreign Application Priority Data

May 18, 2018 (KR) .......................... 10-2018-0057158

(51) Int. Cl.
*B01D 46/00* (2022.01)
*B01D 46/42* (2006.01)

(52) U.S. Cl.
CPC ..... *B01D 46/0056* (2013.01); *B01D 46/0002* (2013.01); *B01D 46/42* (2013.01); *B01D 2279/40* (2013.01)

(58) Field of Classification Search
CPC ............ B01D 46/0056; B01D 46/0002; B01D 46/42; B01D 2279/40; B01D 46/0047; B01D 46/0005; B01D 46/0008; B01D 46/002; B01D 46/24; B01D 46/2403; B01D 46/442; A61L 9/22; A61L 2209/111; A61L 2209/14; F24F 3/1603; F24F 13/20; F24F 13/28; F24F 2013/205; F24F 2013/207;

(Continued)

(56) References Cited

U.S. PATENT DOCUMENTS 2,386,282 A * 10/1945 Watson ................ G01N 1/2202
55/422
2,611,051 A * 9/1952 Van ........................ H01H 36/00
335/205

(Continued)

FOREIGN PATENT DOCUMENTS

CN 203315946 U 12/2013
CN 104374058 A 2/2015

(Continued)

OTHER PUBLICATIONS

English translation of CN204717865U.

(Continued)

*Primary Examiner* — Robert A Hopkins
*Assistant Examiner* — Qianping He
(74) *Attorney, Agent, or Firm* — Peter Chin

(57) ABSTRACT

Disclosed is an air purifier, which is installed outside, and rotates in a blowing direction of wind, and purifies fine dust, yellow dust, heavy metal, and the like existing in the air through a filter. The air purifier includes: a case, which has one side formed with an air inlet, the other side formed with an air outlet, and a lower surface formed with a coupling recess; a filter, which is mounted to the other side of the case; a support part, which is coupled to the coupling recess formed on the lower surface of the case to support the case, and includes a rotating body connected so that the case rotates; and a rudder, which is connected to an upper surface of the case and adjusts a direction so that the case rotates according to a wind direction.

8 Claims, 3 Drawing Sheets

(58) Field of Classification Search
CPC .. F24F 2221/12; G01N 1/2208; G01N 1/2273
USPC .......... 96/108; 73/31.01, 31.02, 863; 55/430
See application file for complete search history.

(56) References Cited

U.S. PATENT DOCUMENTS

| | | | | |
|---|---|---|---|---|
| 5,437,198 | A * | 8/1995 | John | G01N 1/2208 |
| | | | | 73/863.22 |
| 5,607,497 | A * | 3/1997 | Brown | B03C 3/28 |
| | | | | 55/DIG. 39 |
| 7,111,521 | B1 * | 9/2006 | Andrews, Jr. | G01N 1/2247 |
| | | | | 73/863.41 |
| 8,413,527 | B2 * | 4/2013 | Timmis | G01N 1/2273 |
| | | | | 73/863.02 |
| 2009/0107484 | A1* | 4/2009 | Bender | F24S 25/50 |
| | | | | 126/569 |
| 2011/0291305 | A1* | 12/2011 | Choi | F24F 13/20 |
| | | | | 261/30 |

FOREIGN PATENT DOCUMENTS

| | | | |
|---|---|---|---|
| CN | 204717865 | U * | 10/2015 |
| CN | 204717865 | U | 10/2015 |
| CN | 206229102 | U * | 6/2017 |
| CN | 206229102 | U | 6/2017 |
| JP | 06221632 | A * | 1/1993 |
| JP | H06221632 | A | 8/1994 |
| KR | 10-2012-0029490 | | 3/2012 |

OTHER PUBLICATIONS

Ennglish translation of JPH06221632A.
English translation of CN206229102U.
English translation of CN203315946U.
English translation of CN104374058A.

* cited by examiner

[FIG. 1]
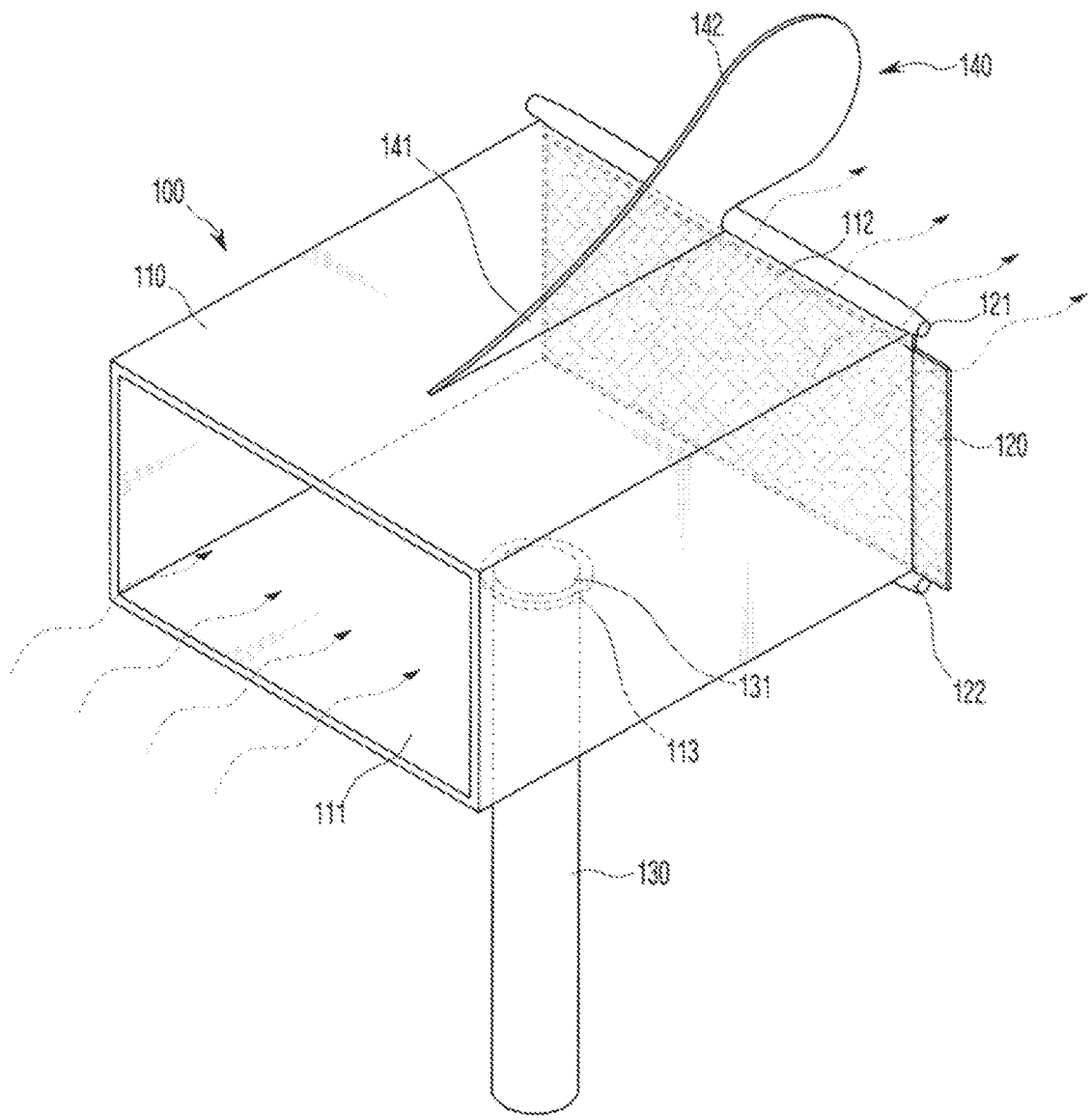

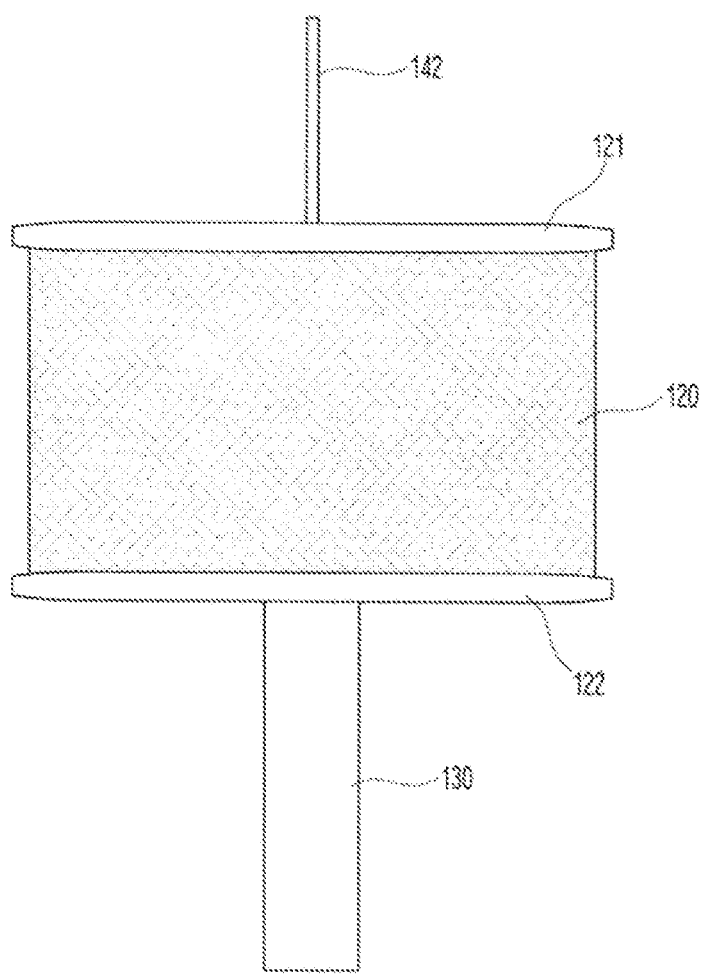
[FIG. 2]

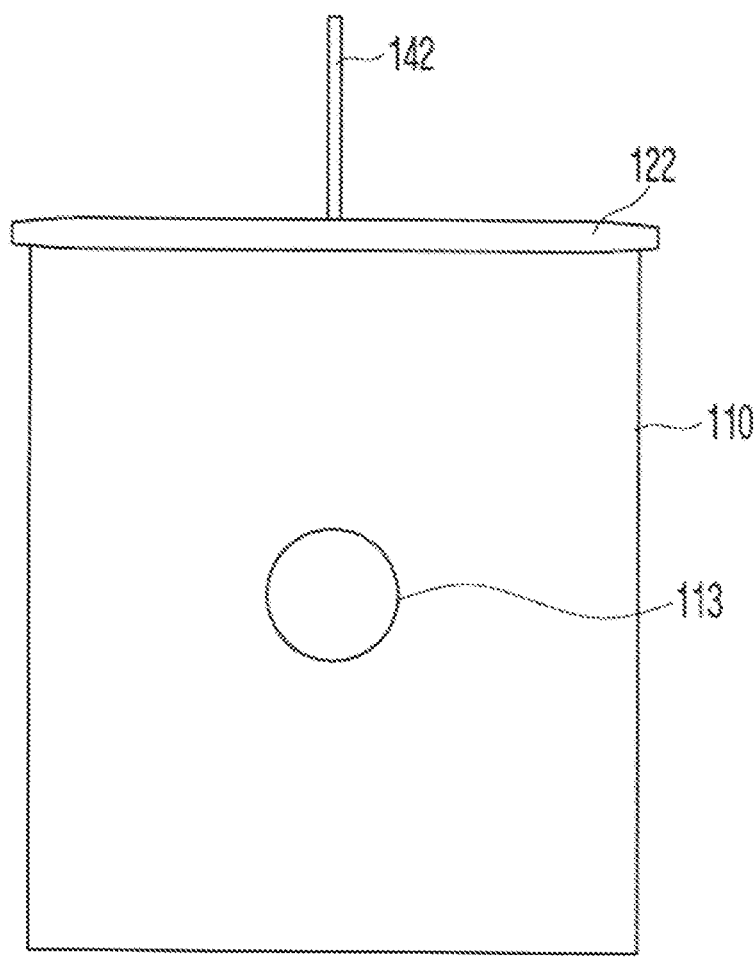
[FIG. 3]

AIR PURIFIER WHOSE AIR INLET DIRECTION IS ADJUSTED ACCORDING TO DIRECTION OF WIND

TECHNICAL FIELD

The present invention relates to an air purifier, and more particularly, to an air purifier, which purifies air included in wind blowing in various directions while rotating.

BACKGROUND ART

An air purifier refers to a device for purifying contaminated air and changing the purified air to fresh air, and sucks contaminated air through a fan and collects or filters fine dust or viruses, and deodorizes bad smell, such as everyday smell or cigarette smell.

Further, the air purifier may include a functional filter and remove particles causing smell, such as cigarette smell and fart smell, within indoor air through a deodorizing filter. However, it is necessary to quarterly replace the functional filter, and the replacement cycle of the functional filter is short, so that there is a problem in that it is difficult to manage the functional filter of a product of a lump sum payment or an overseas sale product, not a rental product, further, replacement service cost is increased according to the repetitive replacement of the functional filter, and there exists inconvenience of a customer due to a time taken for replacing the functional filter.

In order to solve the problem, Korean Patent Application Laid-Open No. 10-2012-0029490 describes an air conditioner using a rolled filler.

However, the air conditioner is mostly used indoor, so that there is a problem in that it is impossible to remove fine dust, yellow dust, and the like existing outside.

DISCLOSURE

Technical Problem

Accordingly, the present invention is conceived to solve the foregoing problem, and to provide an air purifier, which is installed outside, and rotates in a blowing direction of wind, and purifies fine dust, yellow dust, heavy metal, and the like existing in the air through a filter.

Technical Solution

In order to solve the problem, the present invention provides an air purifier, including: a case, which has one side formed with an air inlet, the other side formed with an air outlet, and a lower surface formed with a coupling recess, a filter, which is mounted to the other side of the case; a support part, which is coupled to the coupling recess formed on the lower surface of the case to support the case, and includes a rotating body connected so that the case rotates; and a rudder, which is connected to an upper surface of the case and adjusts a direction so that the case rotates according to a wind direction.

The filter may be a roll filter, includes one pair of rollers mounted to an upper portion and a lower portion of an end portion of the other side of the case, and be wound around the roller.

The rotating body may rotate 360°.

The rudder may include a rudder body part and a rudder wing part, a portion from one side to the other side of a lower end of the rudder body part may be connected from a center portion of the case to the other side of the case, and a curvature of a lower end of one side of the rudder wing part facing the roller may be the same as a curvature of the roller.

The coupling recess may be formed at a point of 5 to 45% of a vertical length of the upper surface of the case in a direction of the air inlet in a center of the lower surface of the case.

Advantageous Effects

According to the present invention, it is possible to provide an air purifier, in which an air inlet is positioned in a blowing direction of wind through a rudder formed in an upper portion of a case and a rotatable support body connected to a lower portion of the case, so that wind enters the inside of the case and air is purified.

DESCRIPTION OF DRAWINGS

FIG. 1 is a perspective view of an air purifier according to the present invention.

FIG. 2 is a rear view of the air purifier according to the present invention.

FIG. 3 is a bottom view of the air purifier except for a support part.

BEST MODE

Hereinafter, an exemplary embodiment of the present invention will be described in detail with reference to the accompanying drawings. In the following description, a detailed explanation of known related functions and constitutions may be omitted so as to avoid unnecessarily obscuring the subject matter of the present invention. In the drawing, a part irrelevant to the description is omitted for clarity of the exemplary embodiment of the present invention, like reference numerals designate like elements throughout the specification, and a direction of a detailed configuration of the present invention will be described based on the drawing. Further, in the specification, unless explicitly described to the contrary, the word "comprise" and variations, such as "comprises" or "comprising", will be understood to imply the inclusion of stated elements but not the exclusion of any other elements.

FIG. 1 is a perspective view of an air purifier according to the present invention, FIG. 2 is a rear view of the air purifier according to the present invention, and FIG. 3 is a bottom view of the air purifier except for a support part.

Referring to FIGS. 1 to 3, an air purifier 100 according to the present invention includes: a case 110, which has one side formed with an air inlet 111, the other side formed with an air outlet 112, and a lower surface formed with a coupling recess 113; a filler 120, which is mounted to the other side of the case 110; a support part 130, which is coupled to the coupling recess 113 formed on the lower surface of the case 110 to support the case 110, and includes a rotating body 131 connected so that the case 110 rotates; and a rudder 140, which is connected to an upper surface of the case 110 and adjusts a direction so that the case 110 rotates according to a wind direction.

The case 110 formed with the air inlet 111 and the air outlet 112 may have a rectangular parallelepiped form, but is not limited thereto.

Further, a material of the case 110 may be metal or plastic, but is not limited thereto.

Further, the coupling recess 113, which may be coupled to the rotating body 131, is formed on the lower surface of the case 110.

Further, the air inlet 111 is a passage, through which external air flows into the inside, and the air outlet 112 is a passage, through which purified air passing through the filter 120 mounted at the other side of the case 110 is discharged to the outside.

In the present invention, the filter 120 may be a roll filter. The filter 120 is a roll filter, and may include one pair of rollers 121 and 122 mounted in an upper portion and a lower portion of an end portion of the other side of the case 110, and the filter 120 may be wound around the rollers 121 and 122.

The roller may include an upper roller 121 and a lower roller 122, and one end of the filter 120 may be wound around the upper roller 121, and the other end of the filter 120 may be wound around the lower roller 122.

Further, the tiller 120 serves to purify contaminated air, and includes various kinds of filters, such as a high efficiency particulate air (HEPA) tiller providing antibacterial and sterilization functions and removing fine dust.

In the present invention, the support part 130 includes the rotating body 131, which is capable of rotating 360°. The support part 130 may be coupled to the coupling recess 113 formed at a point of 5 to 45% of a length of the case 110 in a direction of the air inlet 111 at a center of the lower surface of the case 110.

When the coupling recess 113 is formed at a position less than 5% of the length of the case 110 in the direction of the air inlet 111 at the center of the lower surface of the case 110, the case 110 may not easily rotate during the rotation according to a wind direction, and when the coupling recess 113 is formed at a position more than 45% of the length of the case 110, a center of gravity is not matched, so that the air purifier 100 may fall.

Further, a material of the support part 130 may be metal or plastic, but is not limited thereto.

The rotating body 131, which enables the case 110 to rotate 360°, is formed in the upper portion of the support part 130. The rotating body 131 may be formed of a bearing, but is not limited thereto.

Further, a height of the support part 130 may be 1 to 30 times of the length of the case 110, preferably, 1 to 15 times, and more preferably, 1 to 5 times.

In the present invention, the rudder 140 adjusts a direction of the air inlet 111 of the case 110 according to a wind direction. The rudder 140 may include a rudder body part 141 connected to the upper surface of the case 110 and a rudder wing part 142 formed at the other side of the rudder body part 141.

A portion from one side to the other side of a lower end of the rudder body part 141 may be connected from the center portion of the case 110 to the other side of the case 110, a height of the rudder body part 141 may be increased from the center portion of the upper surface of the case 110 to the other side of the case 110, and a length of a lower end of the rudder body part 141 may be 5 to 50% of a vertical length of the upper surface of the case 110.

Further, a curvature of a lower end of one side of the rudder wing part 142 lacing the upper roller 121 may be the same as a curvature of the upper roller 121, and a distance between the lower end of one side of the wing part 142 and the upper roller 121 may be 5 to 20 cm, particularly, 5 to 10 cm.

When the distance is less than 5 cm, friction may be generated between the upper roller 121 and the rudder wing part 142 during the rotation of the upper roller 121, and when the distance is more than 20 cm, wind passes through a gap between the upper roller 121 and the rudder wind part 142, so that the case 110 may not rotate.

The rudder wing part 142 may be formed at the other side of the rudder body part 141 of the case 110 in the direction of the air outlet, and may be formed at a forming angle of 90°, which is vertical to the upper surface of the case 110, to a forming angle of 180°, which is horizontal to the upper surface of the case 110.

When the forming angle of the rudder wing part 141 is less than 90°, the case 110 may rotate so that the air inlet 111 has the same direction as a blowing direction according to a wind direction, and when the forming angle of the rudder wing part 141 is more than 180°, force by wind is not sufficiently transferred, so that the case 110 may not rotate.

Further, a shape of the rudder wing part 142 may be a circle, but is not limited thereto, and the rudder wing part 142 may be formed from the center portion of the case 110 to a rear side of the air outlet 112 in the direction of the air outlet 112, and a length of the rudder wing part 142 may be 50 to 150% of the length of the lower end of the rudder body part 141.

When the length of the rudder wing part 140 formed at the rear side of the air outlet 112 is less than 50% of the length of the lower end of the rudder body part 141, force by wind is not sufficiently transferred, so that the case 110 may not easily rotate during the rotation according to a wind direction, and when the length of the rudder wing part 140 formed at the rear side of the air outlet 112 is more than 150% of the length of the lower end of the rudder body part 141, it is difficult to match the center of gravity, so that the case 110 may not easily rotate during the rotation according to a wind direction.

Further, a material of the rudder 140 may be metal or plastic, but is not limited thereto.

The air purifier 110 according to the present invention receives force of wind by the rudder 140 when wind blows, a direction of the air inlet 111 formed in the case 110 faces the wind while the bearing included in the rotating body 131 rotates.

Then, the wind passes through the filter 120 mounted to the air outlet 112 while passing through the inside of the case 110, so that fine dust and the like existing in the air are removed, and the air, from which fine dust and the like are removed, is discharged through the air outlet 112.

Further, when the filter 120 is contaminated, the contaminated filter 120 is wound around the upper roller 121 or the lower roller 122 by rotating the rollers 121 and 122 and the filter 120 wound around the upper roller 121 or the lower roller 122 is positioned in the air outlet 121 by rotating the upper roller 121 or the lower roller 122 to purify air.

In the foregoing, the exemplary embodiment of the present invention has been described in detail with reference to the drawings. The description of the present invention is for the purpose of illustration, and those skilled in the art will understand that the present invention may be easily transformed in other particular forms without the change of the technical spirit or the essential features of the present invention.

The scope of the present invention is represented by the claims to be described below rather than the detailed description, and it is to be interpreted that the meaning and scope of the claims and all the changes or modified forms derived from the equivalents thereto come within the scope of the present invention.

EXPLANATION OF REFERENCE NUMERALS AND SYMBOLS

| | |
|---|---|
| 100: Air purifier | |
| 110: Case | 111: Air inlet |
| 112: Air outlet | 113: Coupling recess |
| 120: Filter | 121: Upper roller |
| 122: Lower roller | 130: Support part |
| 131: Rotating body | 140: Rudder |
| 141: Rudder body part | 142: Rudder wing part |

The invention claimed is:

1. An air purifier comprising:
a case, which has one side formed with a single vertical air inlet, an outlet side directly opposite said one side with single vertical air inlet is formed with a vertical air outlet, and a lower surface formed with a coupling recess, said lower surface extends from said air inlet to said air outlet;
a filter having air pollution filtering properties mounted to said outlet side of said case for filtering incoming air from said air inlet;
a support part, which is coupled to the coupling recess wherein the support part is formed on the lower surface of the case to support the case, and wherein the coupling recess includes a rotating body connected so that the case rotates; and
a rudder, which is connected to an upper surface, said upper surface extends from said vertical inlet to said vertical outlet of the case and adjusts a direction so that the case rotates according to a wind direction.

2. The air purifier of claim 1, wherein the filter is a roll filter, includes one pair of rollers mounted to an upper portion and a lower portion of an end portion of said vertical air outlet side of the case, and is wound around the roller.

3. The air purifier of claim 1, wherein the rotating body rotates 360°.

4. The air purifier of claim 2, wherein the rudder includes a rudder body part and a rudder wing part, a portion from one side to the other side of a lower end of the rudder body part is connected from a center portion of said upper surface of said case to the outlet side of the case, and a curvature of a lower end of one side of the rudder wing part facing the roller is the same as a curvature of the roller.

5. The air purifier of claim 1, wherein the coupling recess is formed at a point of 5 to 45% of a vertical length of the upper surface of the case in a direction of the air inlet in a center of the lower surface of the case.

6. The air purifier of claim 1, wherein the filter covers the air outlet of said case.

7. The air purifier of claim 1, wherein said lower surface is a flat planar surface with said coupling recess, said flat planar surface extends continuously from said air inlet to said air outlet.

8. The air purifier of claim 1, wherein said upper surface extends from said vertical inlet to said vertical outlet of the case is a horizontal surface.

* * * * *